June 8, 1948.  C. S. FRANKLIN  2,442,765
GROUND SPEED INDICATOR

Filed Feb. 5, 1946  2 Sheets-Sheet 1

INVENTOR.
CHARLES S. FRANKLIN
BY Harry M. Saragovitz
Attorney

INVENTOR.
CHARLES S. FRANKLIN

Patented June 8, 1948

2,442,765

UNITED STATES PATENT OFFICE 2,442,765

GROUND SPEED INDICATOR

Charles S. Franklin, Dayton, Ohio

Application February 5, 1946, Serial No. 645,68z

3 Claims. (Cl. 161—18)

(Granted under the act of March 3, 1883, as amended April 30, 1928; 370 O. G. 757)

The invention described herein may be manufactured and used by or for the Government for governmental purposes, without the payment to me of any royalty thereon.

The present invention relates to velocity measuring systems and is more particularly directed to a system and apparatus for ascertaining the ground speed of aircraft over a measured course.

One of the present methods of measuring the ground speed of aircraft requires the pilot to make a stopwatch measurement of the time taken to traverse the distance between two fixed known points, usually spaced two to three miles apart to mark a definite course. At the very high speeds achieved in recent years it is difficult for the pilot to handle the aircraft properly and at the same time make accurate stopwatch measurements. Consequently, for accurate results numerous trials must be made and an average obtained not only from one pilot but from several pilots. In making these test runs the aircraft is generally flown at an altitude of approximately 100 feet above the course.

Other methods for precision measurement of aircraft speed have heretofore been proposed. All of them, including localizer beacons, photocell systems, recording theodolites, and high speed cameras require elaborate and expensive installations which are difficult to adjust and operate.

The method proposed by the present invention for measuring the time interval in flight between two fixed points makes use of two rectangular loops of wire located at each of the two fixed points, and a pick-up loop, amplifier, and an electrically operated timing mechanism in the aircraft, the details of which will appear as the description proceeds.

It is, accordingly, a major object of the present invention to provide a system for measuring the ground speed of an aircraft over a given course with a high degree of accuracy.

It is a further object of the present invention to provide simplified, inexpensive apparatus to effectively indicate the time consumed by an aircraft in traveling over a known course.

Figure 1:
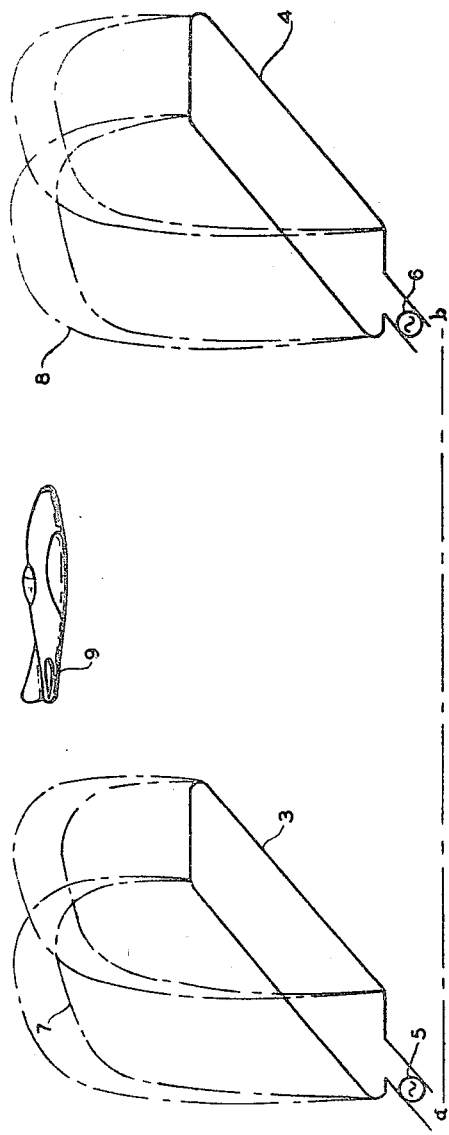
Figure 2:
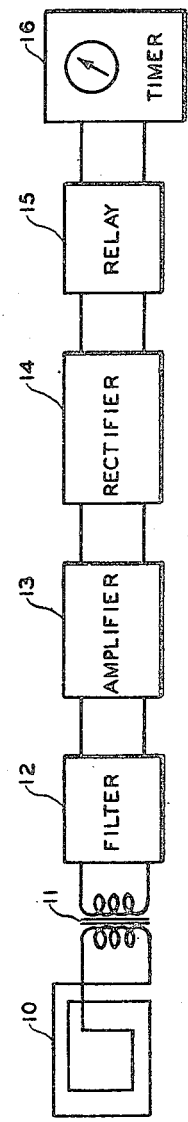
Figure 3:
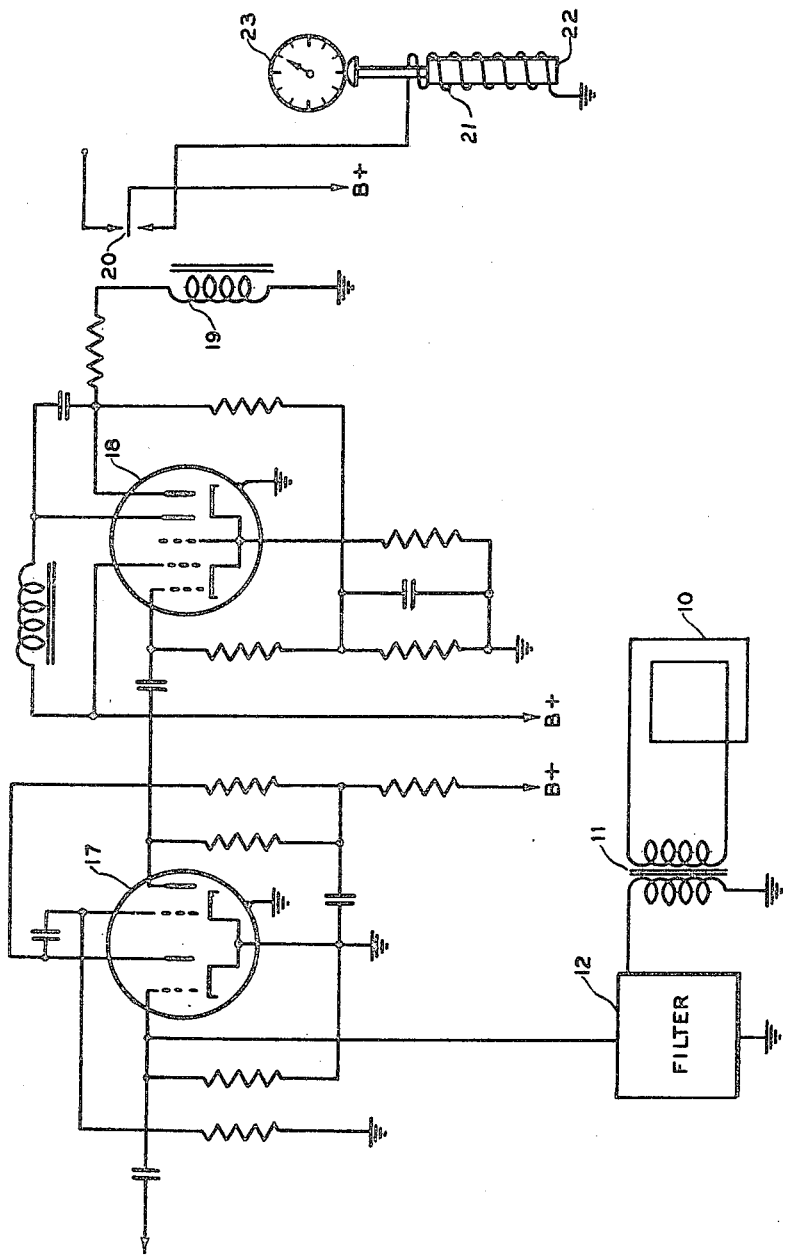

These and other objects and advantages of the present invention will become readily apparent to those skilled in the art from the following detailed description, taken in connection with the accompanying drawings wherein like reference characters denote like components, and in which Figure 1 is a view in elevation of a measured speed course as contemplated by the present invention;

Figure 2 is a block diagram of the timing apparatus to be carried in the aircraft shown in Figure 1; and Figure 3 is a schematic diagram of the audio stages of a conventional aircraft receiver adapted for use in the system in accordance with the invention.

Referring now more particularly to Figure 1 of the drawings, a pair of identical loops 3 and 4 are positioned at the ends of a measured course a—b which may be several miles long and is preferably laid out over level terrain free from elevated obstacles. Loop 3 is energized by a source of alternating current 5 while the loop 4 is similarly energized by a source of alternating current 6. The plane of both loops lie parallel with the ground. Consequently, above the loops 3 and 4 electro-magnetic induction fields will project, as illustrated by the lines 7 and 8, to a considerable height above the terrain. The loops 3 and 4 are preferably of a rectangular shape, their long sides lying normal to the direction of the course. In practice it has been found that when energized by an alternating current of an audio frequency, a sharp and well defined induction field pattern will exist over each loop.

An aircraft 9 is shown flying the measured course a—b and carries the timing means illustrated in Figure 2. As the aircraft 9 crosses the field above loop 3, a signal is induced in a pick-up loop 10, Figure 2. This signal is coupled by a transformer 11 to a suitable amplifier 13 which may comprise the appropriate stages of the conventional aircraft receiver. A suitable band pass filter 12 is provided to prevent spurious signals from actuating the amplifier and timing device. The output of the amplifier 13 is rectified by a rectifier stage 14, and the rectified output operates a relay 15 to start a timer 16. When the aircraft crosses the field above loop 4 marking the end of the measured course, a signal is again induced in the pick-up loop 10, which actuates the relay 15 as above to stop the timer 16. The reading on the timer 16, which may be of the precision stopwatch type, indicates the time which has elapsed while the aircraft has traversed the measured course a—b.

One form of the apparatus carried by the aircraft 9 is illustrated schematically in Figure 3. A signal induced in pick-up loop 10 is impressed through the transformer 11 on the control grid of audio amplifier tube 17. After amplification the signal is impressed on the control grid of the pentode section of amplifier tube 18 where it is further amplified. The diode section of tube 18 provides a rectified current derived from the signal and which passes through relay winding 19, thus causing contact 20 to close. Upon the closing of contact 20 the solenoid 21 is energized. A movable solenoid core 22 thereupon moves upward to actuate the start-stop control on stopwatch 23.

In operation, as the aircraft passes the first loop 3 which marks the beginning of the measured course a—b, the relay contact 20 closes for a short interval, thus energizing the solenoid 21 whereby the movement of its core 22 starts the stopwatch 23. At the end of the course, as the aircraft passes over loop 4, contact 20 again closes for a short interval, solenoid 21 is again energized, and the movement of its core 22 stops the watch 23. The reading on watch 23 indicates the time required by the aircraft to traverse the course.

Since both loops 3 and 4 are substantially identical, and are placed on level terrain free from large obstacles, the respective patterns above them will be substantially identical, such that the timing mechanism in the plane will be triggered at the same aircraft position relative to each loop. Thus the distance between the loops accurately defines the actual timed course over which the aircraft flies.

There has been disclosed what is considered at present to be a preferred embodiment of the present invention. The system herein set forth and described is highly accurate and may be used at high speeds where manually controlled timing means have proven unsatisfactory. No special antenna installations in the aircraft are required; the necessary pick-up loop and associated equipment may be placed inside the fuselage of any aircraft prior to the speed test. After making a run over the speed course it is only necessary for the pilot to read the time interval and manually reset the stopwatch for subsequent runs. The invention gives readings of time interval directly without having to process film or make elaborate calculations.

It should be understood that the disclosure of a specific embodiment of the present invention is made by way of illustration rather than in a limiting sense, since modifications falling within the scope and spirit of the invention as defined by the appended claims may occur to persons skilled in the art.

What is claimed is:

1. A method for measuring the ground speed of aircraft comprising, generating fields of electro-magnetic energy and projecting said fields in vertical patterns at the terminals of a measured course, receiving and amplifying signals derived from said fields in an aircraft, and recording the time of reception thereof.

2. A method for measuring the ground speed of aircraft comprising, generating audio frequency fields of magnetic energy at the terminals of a measured course, projecting said fields in vertical patterns, receiving and amplifying signals derived from said fields in an aircraft, and recording the time of reception thereof.

3. A method for measuring the ground speed of aircraft comprising, generating a first field of electro-magnetic energy at the beginning of a measured course, generating a second field of electro-magnetic energy at the end of said measured course, projecting said fields in vertical patterns, receiving two signals in an aircraft passing over said course, the first derived from said first field and the second derived from said second field, and registering the time elapsed therebetween.

CHARLES S. FRANKLIN.

REFERENCES CITED

The following references are of record in the file of this patent:

UNITED STATES PATENTS

| Number | Name | Date |
|---|---|---|
| 1,516,808 | Duncan | Nov. 15, 1924 |
| 2,083,945 | Evans | June 15, 1937 |